United States Patent
Capoldi et al.

(10) Patent No.: US 9,494,197 B2
(45) Date of Patent: Nov. 15, 2016

(54) METHOD FOR REPLACING SEALING ELEMENTS ON A ROLLING BEARING ASSEMBLY AND SET OF SEALING ELEMENTS

(71) Applicant: Aktiebolaget SKF, Göteborg (SE)

(72) Inventors: Bruno Capoldi, Charentenay (FR); Siegfried Derrer, Höchstadt (DE); Matthias Krebs, Neckargemünd-Dilsberg (DE)

(73) Assignee: AKTIEBOLAGET SKF, Gothenburg (SE)

( * ) Notice: Subject to any disclaimer, the term of this patent is extended or adjusted under 35 U.S.C. 154(b) by 249 days.

(21) Appl. No.: 14/057,534

(22) Filed: Oct. 18, 2013

(65) Prior Publication Data

US 2014/0304992 A1  Oct. 16, 2014

(30) Foreign Application Priority Data

Oct. 19, 2012 (EP) .................................. 12306295

(51) Int. Cl.
| | |
|---|---|
| *F16C 19/38* | (2006.01) |
| *F16C 33/78* | (2006.01) |
| *F16C 33/76* | (2006.01) |
| *F16C 43/04* | (2006.01) |

(52) U.S. Cl.
CPC ............. *F16C 43/045* (2013.01); *F16C 33/76* (2013.01); *F16C 33/7886* (2013.01); *F16C 19/381* (2013.01); *Y10T 29/49638* (2015.01)

(58) Field of Classification Search
CPC .. B23P 6/00; Y10T 29/49638; F16C 43/045; F16C 33/76; F16C 33/7886; F16C 19/381; F16C 33/7833; F16C 33/784
USPC ................................. 29/898.01; 384/477, 486
See application file for complete search history.

(56) References Cited

U.S. PATENT DOCUMENTS 5,375,934 A * 12/1994 Hall .................. F16C 33/76
384/484
5,820,132 A * 10/1998 Marnot ................ F16J 15/008
277/551

(Continued)

FOREIGN PATENT DOCUMENTS

DE 102010018255 A1 10/2011
DE 102011011165 A1 8/2012

*Primary Examiner* — David Bryant
*Assistant Examiner* — Lawrence Averick
(74) *Attorney, Agent, or Firm* — Bryan Peckjian; SKF USA Inc. Patent Dept.

(57) ABSTRACT

This method is for replacing sealing elements on a rolling bearing assembly comprising a rotatable element, a fixed element, and at least one bearing mounted between the rotatable element and the fixed element, at least one used sealing element being rotatably fastened to at least one of the rotatable element and the fixed element and having at least one sealing lip adapted to lay on a first surface of the element with respect to which the used sealing element rotates. The method comprises a step of mounting at least one replacement sealing element so that at least one sealing lip of the replacement sealing element lays on a second surface of the element with respect to which the used sealing element and the replacement sealing element rotate, this second surface being located at a predetermined distance of the first surface.

10 Claims, 6 Drawing Sheets

(56) References Cited

U.S. PATENT DOCUMENTS

| | | | |
|---|---|---|---|
| 5,823,541 A * | 10/1998 | Dietle | F04C 15/0038 277/320 |
| 7,798,496 B2 * | 9/2010 | Dietle | F16J 15/008 277/349 |
| 7,988,364 B2 * | 8/2011 | Versteegh | F03D 11/0008 277/551 |
| 9,010,761 B2 * | 4/2015 | Deutsch | F16J 15/3216 277/300 |
| 2004/0100029 A1 | 5/2004 | Keller et al. | |
| 2013/0039611 A1 * | 2/2013 | Russ | F16C 33/7896 384/486 |

* cited by examiner

METHOD FOR REPLACING SEALING ELEMENTS ON A ROLLING BEARING ASSEMBLY AND SET OF SEALING ELEMENTS

CROSS-REFERENCE

This application claims priority to European Patent Application No. EP12306295 filed on Oct. 19, 2012, the contents of which is incorporated herein by reference.

TECHNICAL FIELD OF THE INVENTION

The invention concerns a method for replacing sealing elements on a rolling bearing assembly. The invention also concerns a set of sealing elements comprising a first sealing element and a replacement sealing element.

BACKGROUND OF THE INVENTION

Rolling bearing assemblies adapted to some applications such a boat propeller systems or tunnel boring machines need specific sealing elements. Such sealing elements often include sealing lips which lay on surfaces of the rotating element. Sealing elements must be changed when they are worn. The surfaces on which the sealing lips are in contact also become worn by the friction of the sealing elements. Premature wear on the sealing lips of the replacement sealing elements is therefore likely to occur.

SUMMARY OF THE INVENTION

The aim of the invention is to provide a new method for replacing sealing elements on a rolling bearing assembly, which permits to improve the efficiency of the sealing elements and the tightness of the assembly.

To this end, the invention concerns a method for replacing sealing elements on a rolling bearing assembly comprising a rotatable element, a fixed element and at least one bearing mounted between the rotatable element and the fixed element, at least one used sealing element being fast in rotation either with the rotatable element or the fixed element and having at least one sealing lip adapted to lay on a first surface of the element with respect to which the used sealing element rotates. This method is characterized in that it comprises a step consisting in mounting at least one replacement sealing element so that at least one sealing lip of the replacement sealing element lays on a second surface of the element with respect to which the used sealing element and the replacement sealing element rotate, this second surface being located at a determined distance of the first surface.

Thanks to the invention, the surface with which the new sealing element is in contact has not been previously worn by the used sealing element. The tightness of the mounting is therefore improved. Moreover, premature damages on the new sealing element are avoided.

According to further aspects of the invention which are advantageous but not compulsory, such a method may include one or several of the following features:
- The method consists in providing the first and second surfaces on a first and a second areas of a cylindrical surface of the one of the rotatable and fixed elements with respect to which the used and replacement sealing elements rotate, the first and second areas being shifted with respect to each other along the rotation axis of the rotatable element.
- The method consists in shifting the first and the second areas by a distance of 10 millimeters, for an assembly where the exterior diameter of the cylindrical surface is of about 2000 mm.
- The method consists in setting the shift distance so that the ratio between the shift distance and the diameter of the cylindrical surface is larger than 0.002, preferably larger than 0.005.
- The method consists in providing a replacement sealing element having at least one sealing lip having a free edge, which is located at the determined distance of a free edge of a corresponding sealing lip of the used sealing element.
- The method comprises a step consisting in mounting a spacer between the replacement sealing element and a surface on which the replacement sealing element is mounted.

The invention also concerns a set of sealing elements comprising a first sealing element and a replacement sealing element, both sealing elements having at least one sealing lip. This set of sealing elements is characterized in that a free edge of the sealing lip of the replacement sealing element is located at a determined distance with respect to a free edge of the corresponding sealing lip of the first sealing element.

According to further aspects of the invention which are advantageous but not compulsory, such a set of sealing element may incorporate one or several of the following features:
- The free edge of the respective at least one sealing lip of the first sealing element and the free edge of the replacement sealing element are shifted by a distance of 10 millimeters along a longitudinal axis of the sealing elements, for sealing elements where the internal diameter of the free edges is of about 2000 millimeters.
- Each of the first sealing element and the replacement sealing element comprises two sealing lips.
- The set of sealing elements comprises two sealing elements and two replacement sealing elements adapted to be mounted with a spacer between them, and wherein each of the two sealing elements and replacement sealing elements comprises one sealing lip.

The disclosure also concerns a method that includes providing a rolling bearing assembly including a first component and a second component, the first component being rotatable relative to the second component or the second component being rotatable relative to the first component, the second component having a first annular portion and a second annular portion non-coincident with the first annular portion. The rolling bearing assembly further includes at least one bearing mounted between the first component and the second component and at least one used sealing element secured against rotation relative to and in direct contact with a mounting surface of the first component. The used sealing element also has at least one sealing lip on the first annular portion of the second component, and a point on the mounting surface is axially spaced in a direction from an axial midpoint of the first annular portion by a distance. The method includes mounting at least one replacement sealing element so that at least one sealing lip of the replacement sealing element lays on the second annular portion of the second component. The point on the mounting surface is axially spaced in the direction from the axial midpoint of the first annular portion by the distance after mounting the at least one replacement sealing element.

BRIEF DESCRIPTION OF THE DRAWINGS

The invention will now be explained in correspondence with the following figures, as an illustrative example. In the annexed figures.

DETAILED DESCRIPTION OF THE INVENTION

A rolling bearing assembly A is represented on FIGS. 1 and 3 to 6. This rolling bearing assembly A comprises a rotatable element R, which is a rotatable shaft of a propeller supporting structure of a boat. Rolling bearing assembly A also comprises a fixed element, which is a housing H in which rotatable element R is mounted. Rolling bearing assembly A also comprises rolling bearing systems which permits the rotation of rotatable element R with respect to housing H along a longitudinal rotation axis X-X'. These systems comprise two radial roller bearings 2, including rollers which have a rotation axis perpendicular to axis X-X', and one axial roller bearing 4, including rollers which have a rotation axis parallel to axis X-X'.

According to a non-shown embodiment of the invention, rolling bearing assembly A may comprise other types of rolling bearing systems, such as ball bearings, needle bearings or plain bearings.

Figure 1:
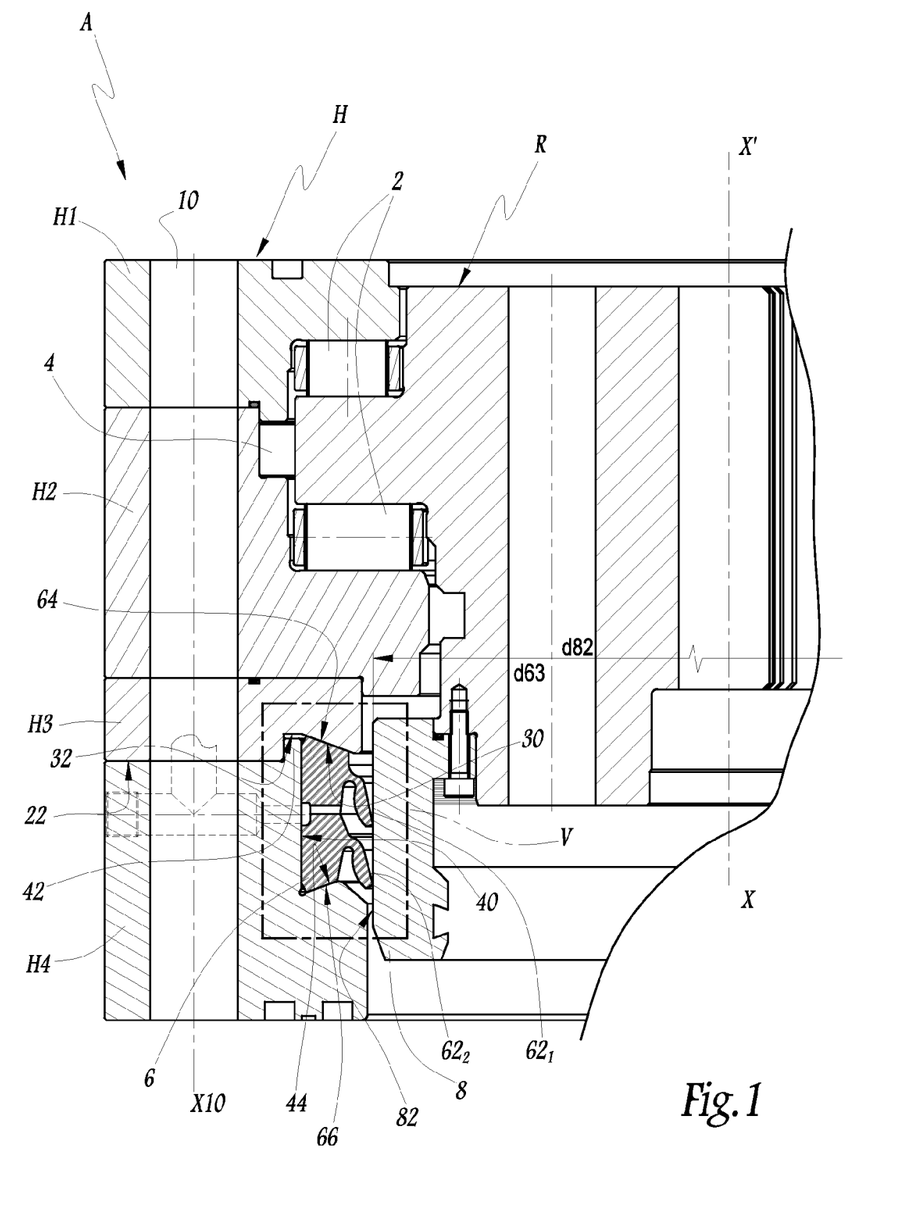
FIG. 1 is a sectional view, along a longitudinal axis, of a rolling bearing assembly with which the method according to the invention can be implemented.

Rolling bearing assembly A also includes at least one sealing element 6 adapted to prevent a lubrication oil, which facilitates rotation of rotatable element R with respect to housing H, from getting outside assembly A, and to prevent exterior elements, such as sea water, from getting inside rolling bearing assembly A and damaging its components. Sealing element 6 is fast in rotation with and mounted in housing H, and rotates with respect to rotatable element R. Sealing element 6 comprises two sealing lips $62_1$ and $62_2$ which are oriented radially towards axis X-X' and which lay on an outer peripheral surface 82 of a tubular element 8 belonging to rotatable element R.

Housing H is made of several parts including a main part H1, a middle part H2 in which radial and axial roller bearings 2 and 4 are mounted, an intermediate washer H3 and a cover H4. Parts H1, H2, H3 and H4 are adapted to be assembled together along axis X-X' thanks to non-shown bolts inserted in bores, one of which is shown on FIGS. 1, 3 and 4 with reference 10, the bore being centred on an axis X10 parallel to axis X-X'. Each bore extends in a longitudinal portion of parts H1, H2, H3 and H4. Intermediate washer H3 is adapted to be mounted on an annular mounting surface 22 of middle part H2. Intermediate washer H3 comprises a mounting surface 30 which has a frustoconical shape centred around axis X-X'. Mounting surface 30 extends towards axis X-X' opposite from middle part H2. A corresponding frustoconical surface 64 of sealing element 6 is adapted to make a sealing contact with mounting surface 30 when sealing element 6 is mounted into housing H.

Cover H4 comprises an inner cylindrical surface 40 centred around axis X-X'. Inner surface 40 extends along axis X-X' between a collar 42 of cover H4, adapted to be inserted in a cavity 32 of intermediate washer H3, mounting surface 30 forming a surface of cavity 32. Opposite from collar 42, inner surface 40 comprises a frustoconical surface 44, which has a shape similar to frustoconical mounting surface 30 but converges towards axis X-X' in the direction of intermediate washer H3. Frustoconical surfaces 30 and 44 face each other along axis X-X'.

Sealing element 6 is mounted in intermediate washer H3 and cover H4 so that frustoconical surface 64 makes a contact with mounting surface 30, and so that a frustoconical surface 66 of sealing element 6, which is opposed to surface 64 along axis X-X', males a sealing contact with frustoconical surface 44 of cover H4. In the assembled configuration of rolling bearing assembly A represented on FIG. 1, sealing lips $62_1$ and $62_2$ respectively lay on contact surfaces S1 and S2, which are represented on FIGS. 5 and 6 by segments of peripheral surface 82 parallel to axis X-X'. Surfaces S1 and S2 have a ring shape extending around axis X-X' on the circumference of tubular element 8. Surfaces S1 and S2 define a first area of surface 81.

Figure 5:
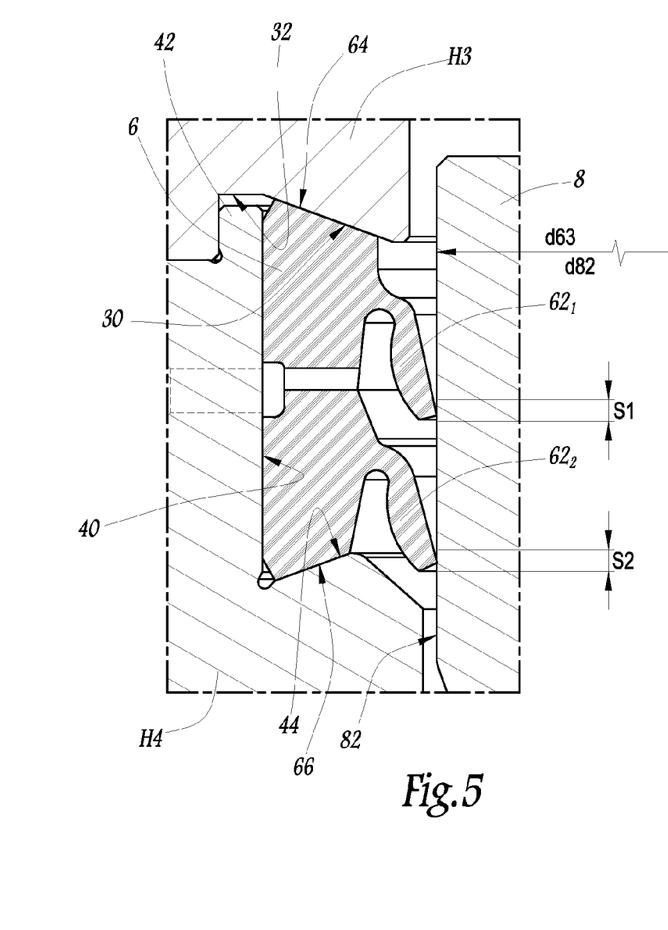
FIG. 5 is a view, at a larger scale, of detail V on FIG. 1.

When rotatable element R rotates around housing H, the friction between sealing lips $62_1$ and $62_2$ on the one hand, and peripheral surface 82, on the other hand, provoke wear on contact surfaces S1 and S2. This friction also damages sealing lips $62_1$ and $62_2$. Sealing element 6 must therefore be replaced by a replacement sealing element 6B when sealing element 6 becomes worn off. In what follows, sealing element 6 will be referred as "used" sealing element 6. Unless precised, replacement sealing element 6B has the same structure as used sealing element 6.

In order to guarantee that the sealing lips $62_1$B and $62_2$B of replacement sealing element 6B do not lay on contact surfaces S1 and S2 which have been already worn by friction with sealing lips $62_1$ and $62_2$, replacement sealing element 6B is designed so that sealing lips $62_1$B and $62_2$B lay on surfaces S3 and S4 which are located at a non-zero distance of surfaces S1 and S2. Surfaces S3 and S4 are represented on FIG. 6 by segments of peripheral surface 82 and define a second area of surface 81.

To replace used sealing element 6 with replacement sealing element 6B, intermediate washer H3 and cover H4 are dismounted from middle part H2. Intermediate washer H3 is then dismounted from cover H4 so that used sealing element 6 can be extracted from cover H4. Replacement sealing element 6B is then mounted in cover H4. Intermediate washer H3 is then replaced onto cover H4 before the assembly comprising intermediate washer H3, cover H4 and replacement sealing element 6B is fixed again to middle part H2.

Figure 6:
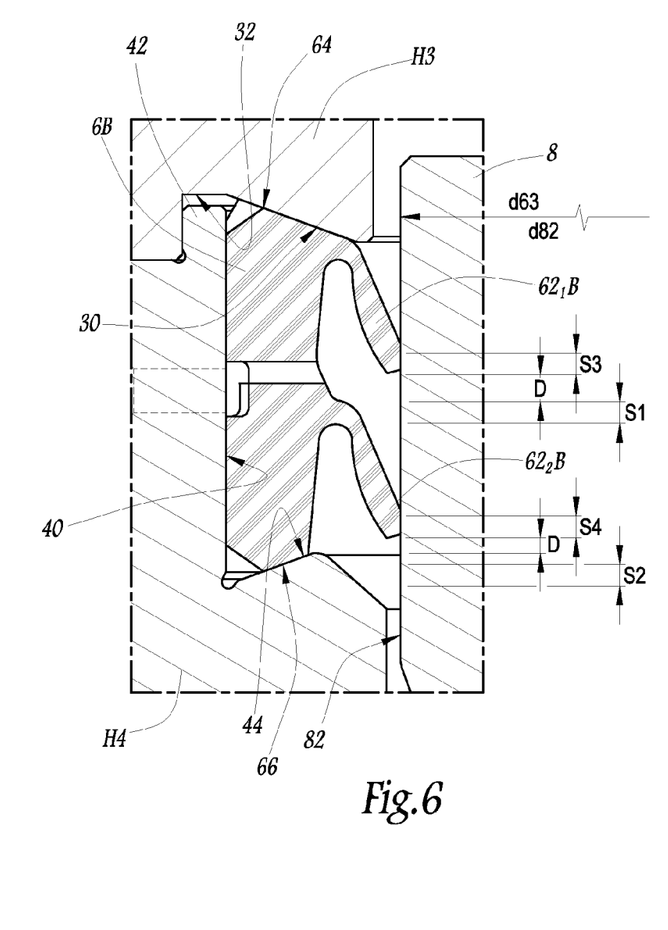
FIG. 6 is a view similar to FIG. 5, the seal represented on FIG. 5 being replaced by the replacement seal of FIG. 2.

As shown on FIG. 6, new contact surfaces S3 and S4 are shifted, along axis X-X', with respect to contact surfaces S1 and S2, by a shift distance D which is larger than 5 mm, preferably larger than 10 mm, for an assembly A where the exterior diameter d82 of surface 82 is of about 2000 mm. In other words, the ratio of distance D on diameter d82 is larger than 0.002, preferably larger than 0.005.

Figure 2:
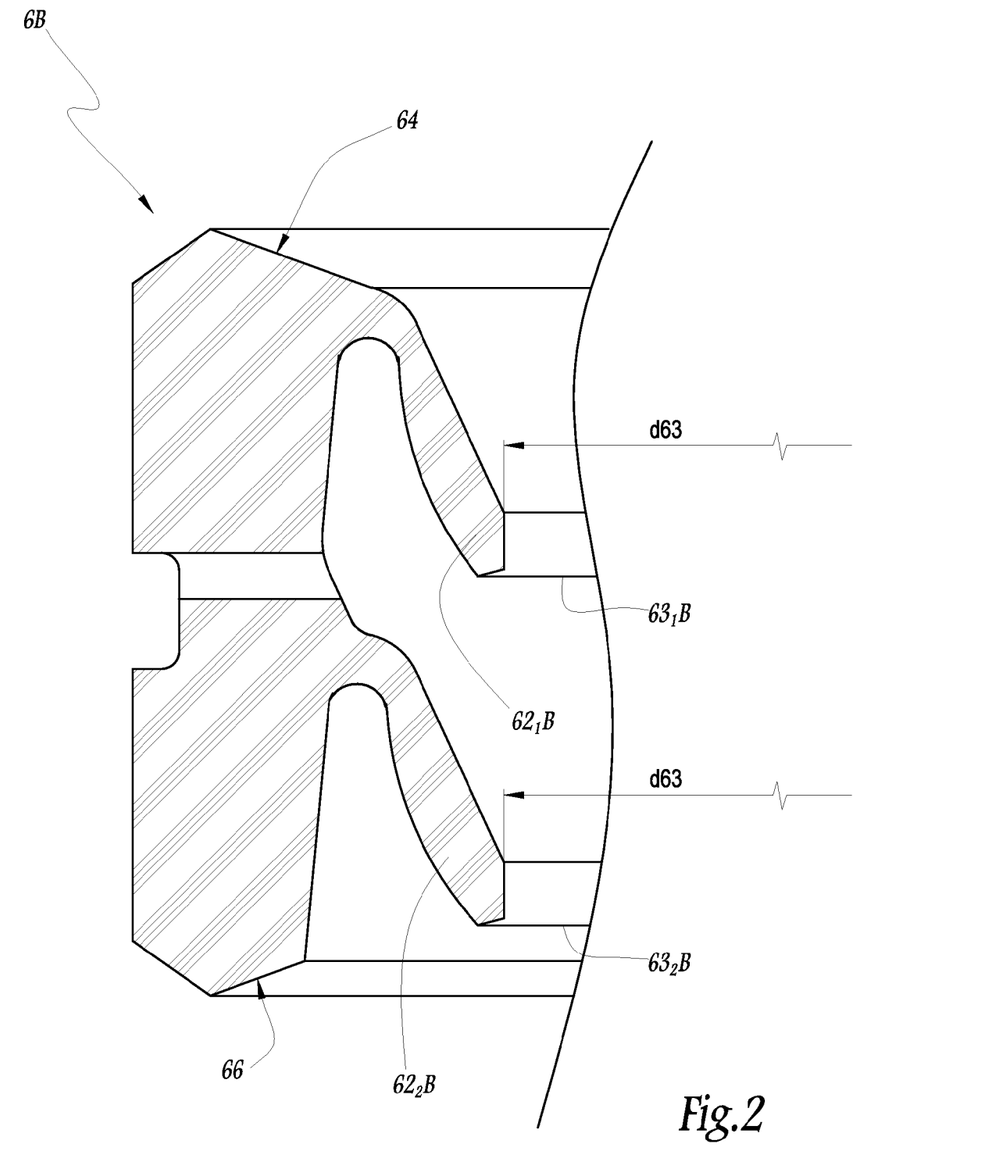
FIG. 2 is a sectional view of a replacement seal used in the method according to the invention.
Figure 3:
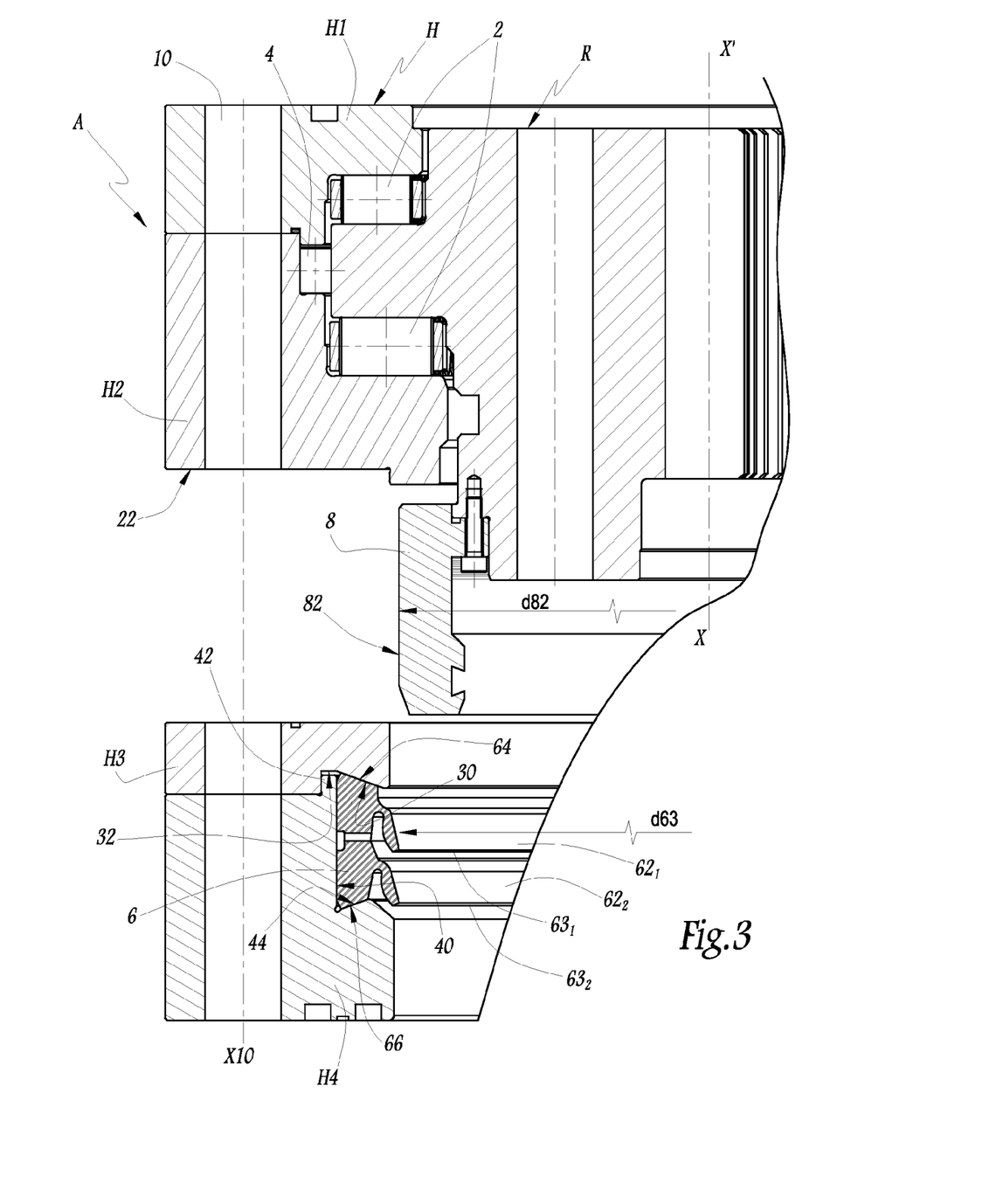
FIG. 3 is a sectional view of the rolling bearing assembly of FIG. 1, in a partially dismounted configuration.
Figure 4:
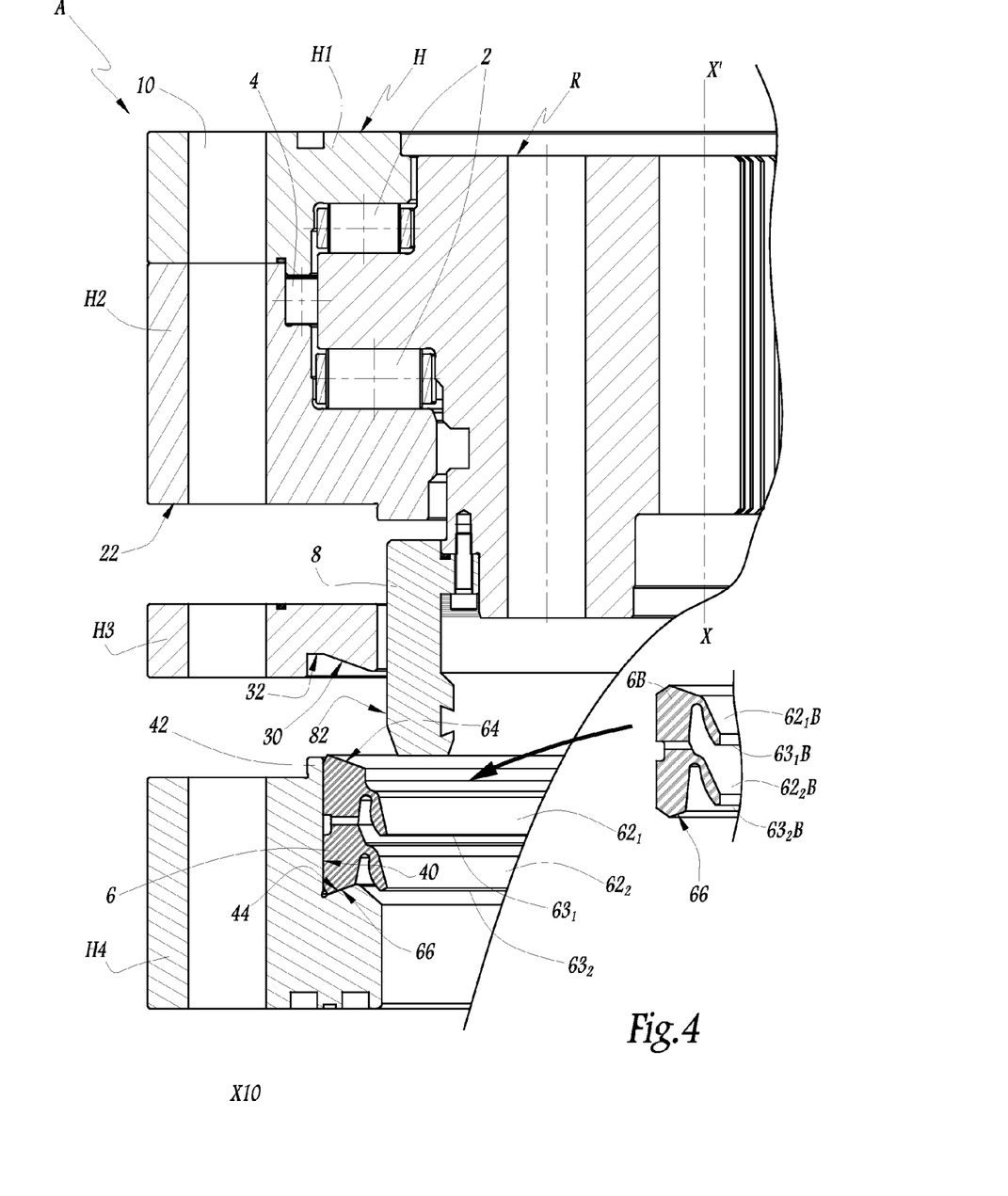
FIG. 4 is a sectional view of a sealing element replacement operation on the rolling bearing assembly of FIGS. 1 and 3.

In the replacement sealing element represented on FIG. 2, the free edges $63_1$B and $63_2$B of sealing lips $62_1$B and $62_2$B are shifted, along axis X-X', with respect to the free edges $63_1$, $63_2$ of sealing lips $62_1$ and $62_2$, by shift distance D, for sealing elements 6 and 6B where the internal diameter d63 of free edges $63_1$, $63_2$ and $63_1$B and $63_2$B is of about 2000 millimeters.

The shift between contact surfaces S1 and S2 on the one hand, and with surfaces S3 and S4 on the other hand, can also be obtained by mounting a spacer between surface 30 and replacement sealing element 6B, or between surface 44 and replacement sealing element 6B.

Figure 7:
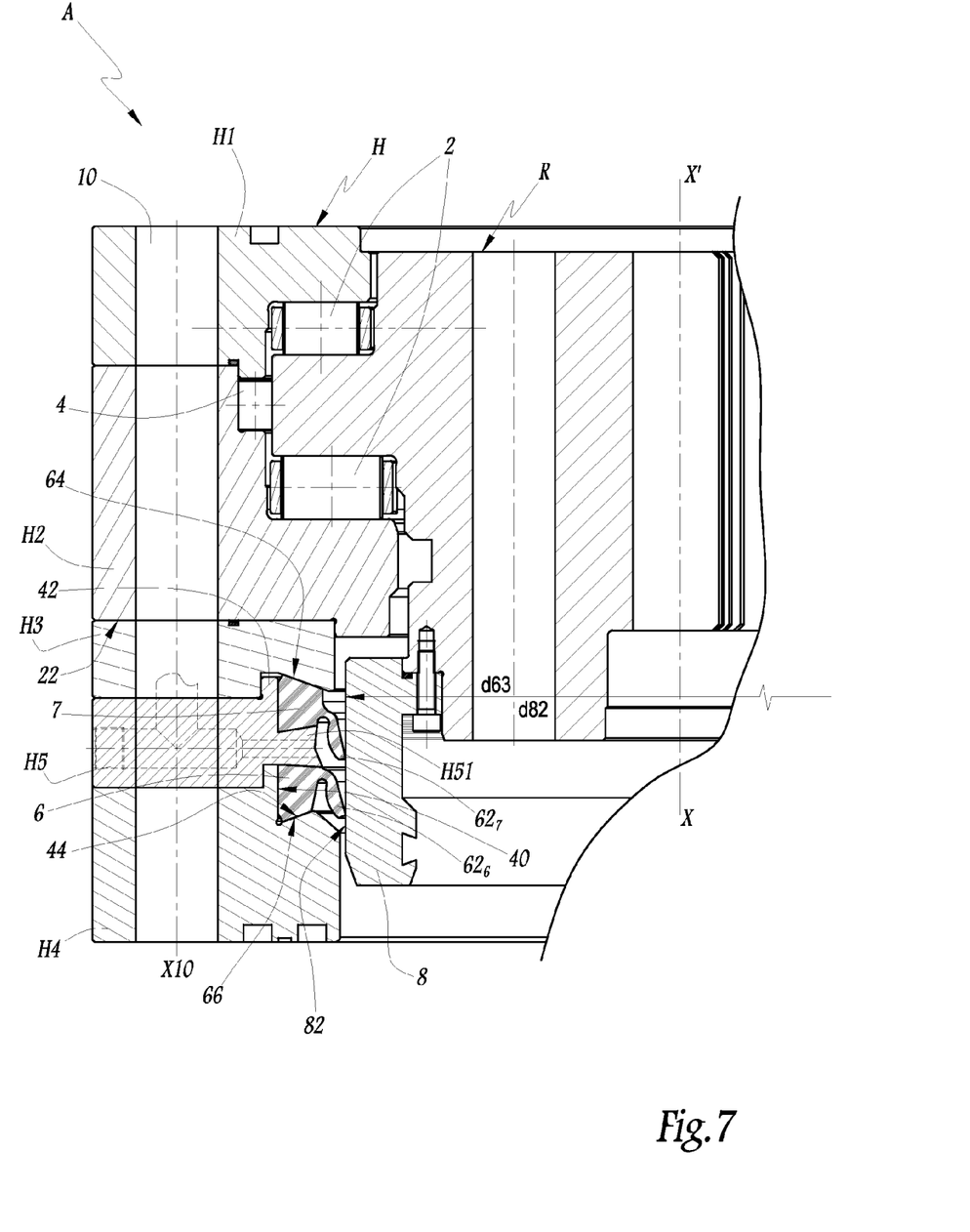
FIG. 7 is a view similar to FIG. 1, for a second embodiment of the invention.

A second embodiment of the invention is represented on FIG. 7. In this embodiment, elements similar to the first embodiment have the same references and work in the same way. This embodiment differs from the embodiment of FIGS. 1 to 6 by the fact that rolling bearing assembly A comprises two sealing elements 6 and 7 separated, along axis X-X', by a spacer element H51 belonging to a part H5 of housing H inserted between cover H4 and intermediate washer H3. Each of sealing elements 6 and 7 comprises one sealing lip $62_6$, respectively $62_7$.

In this embodiment, both sealing elements 6 and 7 are replaced, when worn out, by non-shown replacement sealing elements having sealing lips which are shifted, along axis X-X', with respect to sealing lips $62_6$ and $62_7$ of used sealing elements 6 and 7.

According to a non-shown embodiment of the invention, the structure of rolling bearing assembly A may be inverted with respect to the structure of the two previous embodiments. For example, sealing element 6 may be fast in rotation with rotatable element R instead of being fast in rotation with fixed element H.

According to a non-shown embodiment of the invention, contact surfaces S3 and S4 may also be shifted along a radial direction with respect to surfaces S1 and S2.

According to another non-shown embodiment of the invention, the contact surfaces S3 and S4 may also be shifted from surfaces S1 and S2 by providing a replacement sealing element 6B on which the inclination of sealing lips $62_1$B and $62_2$B with respect to axis X-X' is modified.

According to another non-shown embodiment of the invention, the sealing element replacement method according to the invention may be applied to other types of rolling bearing assemblies used in other technical domains, such as wind turbines, industrial gearboxes or tunnel boring machines.

The invention claimed is:

1. A method comprising:
    providing a rolling bearing assembly having a rotatable element, a fixed element, and at least one bearing mounted between the rotatable element and the fixed element, and at least one used sealing element secured against rotation relative to and in direct contact with a mounting surface of one of the rotatable element and the fixed element and having at least one sealing lip on a first surface of the element with respect to which the used sealing element rotates, a point on the mounting surface being axially spaced in a direction from an axial midpoint of the first surface by a distance, and
    mounting at least one replacement sealing element so that at least one sealing lip of the replacement sealing element lays on a second surface of the element with respect to which the used sealing element and the replacement sealing element rotate, said second surface being located at a determined distance of the first surface, the point on the mounting surface being axially spaced from the axial midpoint of the first surface in the direction by the distance after mounting the at least one replacement sealing element.

2. The method according to claim 1, further comprising providing the first and second surfaces on first and second areas of a cylindrical surface of the one of the rotatable and fixed elements with respect to which the used and replacement sealing elements rotate, the first and second areas being shifted with respect to each other along the rotation axis of the rotatable element.

3. The method according to claim 2, further providing shifting the first and the second areas by a distance of 10 millimeters, for an assembly where the exterior diameter of the cylindrical surface is of about 2000 mm.

4. The method according to claim 3, further comprising setting the shift distance so that the ratio between the shift distance and the diameter of the cylindrical surface is larger than 0.005.

5. The method according to claim 3, further comprising setting the shift distance so that the ratio between the shift distance and the diameter of the cylindrical surface is larger than 0.002.

6. The method according to claim 5, further comprising providing a replacement sealing element having at least one sealing lip having a free edge, which is located at the predetermined distance of a free edge of a corresponding sealing lip of the used sealing element.

7. The method according to any preceding claim, further comprising mounting a spacer between the replacement sealing element and a surface on which the replacement sealing element is mounted.

8. A method comprising:
    providing a rolling bearing assembly including a first component and a second component, the first component being rotatable relative to the second component or the second component being rotatable relative to the first component, the second component having a first annular portion and a second annular portion non-coincident with the first annular portion, the rolling bearing assembly further including at least one bearing mounted between the first component and the second component and at least one used sealing element secured against rotation relative to and in direct contact with a mounting surface of the first component and having at least one sealing lip on the first annular portion of the second component, a point on the mounting surface being axially spaced in a direction from an axial midpoint of the first annular portion by a distance, and
    mounting at least one replacement sealing element so that at least one sealing lip of the replacement sealing element lays on the second annular portion of the second component, the point on the mounting surface being axially spaced in the direction from the axial midpoint of the first annular portion by the distance after mounting the at least one replacement sealing element.

9. The method according to claim 8, wherein the second annular portion does not overlap the first annular portion.

10. The method according to claim 8, wherein the second annular portion is spaced from the first annular portion by a gap.

* * * * *